US008681989B2

(12) United States Patent
Park et al.

(10) Patent No.: US 8,681,989 B2
(45) Date of Patent: Mar. 25, 2014

(54) WCDMA 3G VOICE COMMUNICATION PROTECTION METHOD AND TERMINAL USING THE SAME

(75) Inventors: Yong-Seok Park, Daejeon (KR); Jong-Mok Son, Daejeon (KR); Jae-Hwan Ahn, Daejeon (KR); Dong-Wook Lee, Daejeon (KR); Yong-Ick Chung, Daejeon (KR); Jang-Hong Yoon, Daejeon (KR)

(73) Assignee: Electronics & Telecommunications Research Institute, Daejeon (KR)

( * ) Notice: Subject to any disclaimer, the term of this patent is extended or adjusted under 35 U.S.C. 154(b) by 44 days.

(21) Appl. No.: 13/439,326

(22) Filed: Apr. 4, 2012

(65) Prior Publication Data

US 2013/0136260 A1    May 30, 2013

(30) Foreign Application Priority Data

Nov. 28, 2011  (KR) .......................... 10-2011-0125106

(51) Int. Cl.
*H04K 1/00* (2006.01)
(52) U.S. Cl.
USPC .......................................................... 380/270
(58) Field of Classification Search
USPC .................... 713/150, 171; 380/270; 726/2
See application file for complete search history.

(56) References Cited

U.S. PATENT DOCUMENTS

| 2010/0262828 | A1* | 10/2010 | Brown et al. ............ 713/171 |
| 2011/0299471 | A1* | 12/2011 | Wang .................... 370/328 |
| 2012/0047551 | A1* | 2/2012 | Pattar et al. ............ 726/1 |

FOREIGN PATENT DOCUMENTS

| KR | 10-2006-0035375 A | 4/2006 |
| KR | 10-2008-0029521 A | 4/2008 |
| KR | 10-2010-0043799 A | 4/2010 |

* cited by examiner

*Primary Examiner* — Brandon Hoffman
*Assistant Examiner* — Anthony Brown
(74) *Attorney, Agent, or Firm* — LRK Patent Law Firm

(57) ABSTRACT

A WCDMA 3G voice communication protection method and a terminal using the method are provided. The method is performed by a terminal operating in conjunction with an S-USIM for voice communication protection. When a calling terminal connects a voice communication channel to a called terminal, secure voice communication is prepared for by collecting information about relevant voice communication. At the calling terminal, synchronous data is set by exchanging the voice communication information with the called terminal, and a secure synchronization procedure is performed based on the set synchronous data. At each of S-USIMs that operate in conjunction with the calling and called terminals, a session key for secure voice communication is generated based on the synchronous data. Secure communication is performed by encrypting and transmitting voice-coded data to be transmitted based on the session key, and decrypting and reproducing received voice-coded data based on the session key.

11 Claims, 3 Drawing Sheets

US 8,681,989 B2

WCDMA 3G VOICE COMMUNICATION PROTECTION METHOD AND TERMINAL USING THE SAME

CROSS REFERENCE TO RELATED APPLICATION

This application claims the benefit of Korean Patent Application No. 10-2011-0125106, filed on Nov. 28, 2011, which is hereby incorporated by reference in its entirety into this application.

BACKGROUND OF THE INVENTION

1. Technical Field

The present invention relates generally to a Wideband Code Division Multiple Access $3^{rd}$ Generation (WCDMA 3G) voice communication protection method and a terminal using the method. More particularly, the present invention relates to a WCDMA 3G voice communication protection method and a terminal using the method, which use a secure mobile communication terminal composed of a Secure-Universal Subscriber Identity Module (hereinafter referred to as a "S-USIM") for voice communication protection and a secure 3G terminal as each of calling and called terminals in a WCDMA 3G mobile communication network, thus providing end-to-end protection for voice communication.

2. Description of the Related Art

Recently, owing to the advantages of easily accessing networks and enabling communication to be possible in a mobile environment, a communication environment has been reorganized from a conventional wired communication network-centered environment into a wireless mobile communication network-centered environment.

In particular, with the improvement of sound quality and the popularization of smart phones due to the development of recent technologies, the number of users who use WCDMA 3G mobile communication has rapidly increased.

Generally, it is known that WCDMA 3G mobile communication makes it difficult for a third party to access communication data in a wireless channel due to the characteristics of Code Division Multiple Access (CDMA) communication schemes. However, when information about a mobile communication terminal is known, it is possible for a third party to access communication data in a wireless channel. In particular, in an interval except for a wireless channel, the data of a voice encoder is transmitted in the form of plain text, thus causing the problem of being vulnerable to access of communication data by a third party. Due thereto, in order to protect voice communication that is performed over a WCDMA 3G mobile communication network, end-to-end security for voice communication data between a calling terminal and a called terminal is currently required.

In WCDMA 3G mobile communication, subscriber information is stored in a universal subscriber identity module (hereinafter also referred to as a "USIM"). That is, since subscribers are identified based on the USIM, each user detachably installs a USIM containing information about the subscriber, thus enabling a mobile communication terminal to be easily replaced and used.

However, in this situation, when an encryption function or a key management function is directly installed in a mobile communication terminal, a problem arises in that it is difficult to manage such functions because a mismatch may occur between the subscriber and the key stored in the mobile communication terminal.

SUMMARY OF THE INVENTION

Accordingly, the present invention has been made keeping in mind the above problems occurring in the prior art, and an object of the present invention is to provide a voice communication protection method and a terminal using the method, which use a secure mobile communication terminal composed of an S-USIM and a secure 3G terminal as each of calling and called terminals in a WCDMA 3G mobile communication network, thus performing end-to-end protection for voice communication.

In accordance with an aspect of the present invention to accomplish the above object, there is provided a Wideband Code Division Multiple Access 3rd Generation (WCDMA 3G) voice communication protection method, the method being performed by a terminal operating in conjunction with a Secure-Universal Subscriber Identity Module (S-USIM) for voice communication protection and configured to protect WCDMA 3G voice communication, including when a calling terminal connects a voice communication channel to a called terminal, preparing for secure voice communication by collecting information about relevant voice communication; at the calling terminal, setting synchronous data by exchanging the voice communication information with the called terminal, and performing a secure synchronization procedure based on the set synchronous data; at each of S-USIMs that operate in conjunction with the calling and called terminals, generating a session key for secure voice communication based on the synchronous data; and performing secure communication by encrypting and transmitting voice-coded data to be transmitted based on the session key, and decrypting and reproducing received voice-coded data based on the session key.

Preferably, the preparing for the secure voice communication may be configured to prepare for the secure voice communication by collecting voice communication information that includes USIM information corresponding to the S-USIM operating in conjunction with the calling terminal and terminal information corresponding to the calling terminal.

Preferably, the performing the secure synchronization procedure may be configured to establish timing synchronization for secure communication based on the synchronous data, thus performing the secure synchronization procedure.

Preferably, the generating the session key may include searching for a user key corresponding to the synchronous data; and generating the session key based on the user key and the synchronous data.

Preferably, the terminal operating in conjunction with the S-USIM may correspond to a secure 3G terminal.

In accordance with another aspect of the present invention to accomplish the above object, there is provided a terminal using a Wideband Code Division Multiple Access 3rd Generation (WCDMA 3G) voice communication protection method, including a Radio Frequency (RF) communication unit for allowing the terminal to transmit or receive synchronous data and voice data to or from another party terminal via RF communication; an audio processing unit for converting a voice corresponding to a user of the terminal into voice-coded data or converting voice-coded data corresponding to the other party terminal into a voice; an encryption/decryption processing unit for encrypting voice-coded data to be transmitted based on a session key generated by a relevant Secure-Universal Subscriber Identity Module (S-USIM), and decrypting received voice-coded data based on the session key; and a control unit for performing a secure synchronization procedure with the other party terminal using voice communication information, and performing secure communication by transmitting encrypted data and reproducing decrypted data.

Preferably, the control unit may allow the terminal to set synchronous data by exchanging the voice communication information with the other party terminal, and performs the secure synchronization procedure based on the set synchronous data.

Preferably, the session key may correspond to a session key for secure voice communication, which is generated by the S-USIM based on the synchronous data set using the secure synchronization procedure.

Preferably, the control unit may perform the secure synchronization procedure by establishing timing synchronization for secure communication based on the synchronous data.

Preferably, the terminal may further include an interworking unit for allowing the terminal to operate in conjunction with the S-USIM corresponding to a security token.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
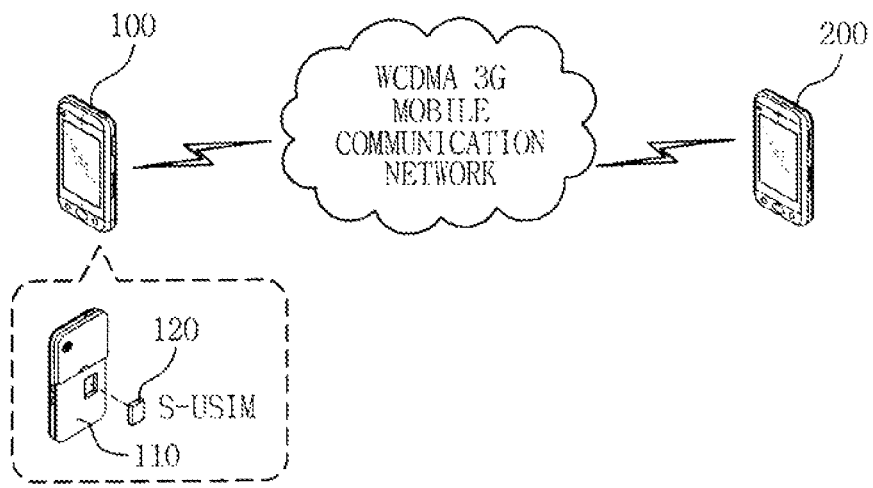
FIG. 1 is a diagram schematically showing an environment in which a terminal using a WCDMA 3G voice communication protection method is located according to an embodiment of the present invention.

The present invention will be described in detail below with reference to the accompanying drawings. In the following description, redundant descriptions and detailed descriptions of known functions and elements that may unnecessarily make the gist of the present invention obscure will be omitted. Embodiments of the present invention are provided to fully describe the present invention to those having ordinary knowledge in the art to which the present invention pertains. Accordingly, in the drawings, the shapes and sizes of elements may be exaggerated for the sake of a clearer description.

Hereinafter, a WCDMA 3G voice communication protection method and a terminal using the method according to embodiments of the present invention will be described in detail with reference to the attached drawings.

FIG. 1 is a diagram schematically showing an environment in which a terminal using a WCDMA 3G voice communication protection method is located according to an embodiment of the present invention.

Referring to FIG. 1, each of a calling terminal 100 and a called terminal 200 corresponds to the terminal using the WCDMA 3G voice communication protection method according to an embodiment of the present invention. In this case, the calling terminal 100 and the called terminal 200 are connected to each other over a WCDMA 3G mobile communication network and then perform an end-to-end protection procedure for voice communication.

The terminal using the WCDMA 3G voice communication protection method includes a terminal unit 110 and a Secure-Universal Subscriber Identity Module (S-USIM) unit 120 for voice communication protection.

The terminal unit 110 corresponds to a secure 3G terminal.

The S-USIM unit 120 corresponds to a security token (hardware security module).

The terminal using the WCDMA 3G voice communication protection method corresponds to a secure mobile communication terminal. The secure mobile communication terminal is characterized in that the S-USIM unit 120 takes charge of an encryption function and a key management function and the secure 3G terminal 110 takes charge of the operation of the S-USIM unit 120 and the support of a secure operation.

Next, the construction of the terminal using the WCDMA 3G voice communication protection method will be described in detail below with reference to FIGS. 2 and 3.

Figure 2:
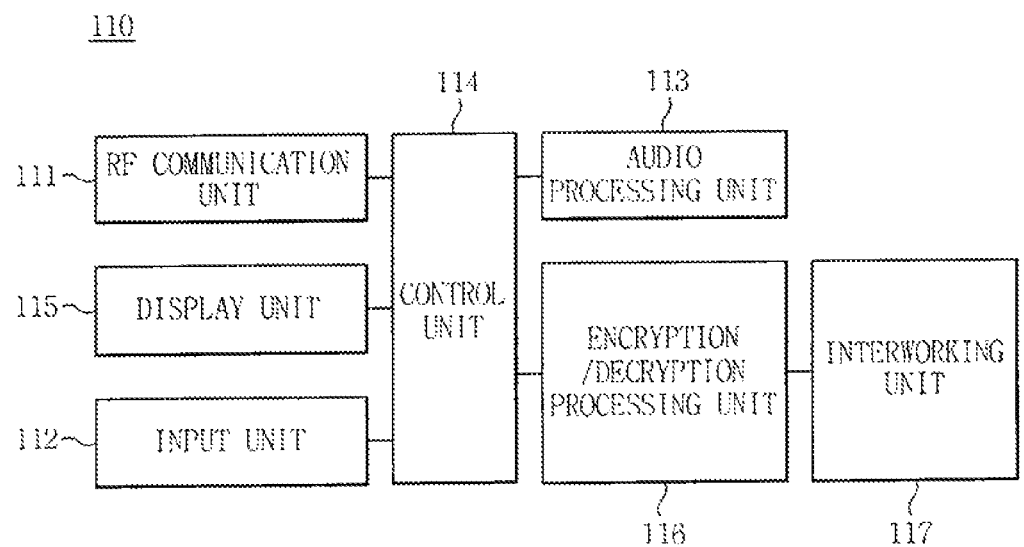
FIG. 2 is a block diagram showing the construction of the secure 3G terminal unit of the terminal using the WCDMA 3G voice communication protection method according to an embodiment of the present invention.
Figure 3:
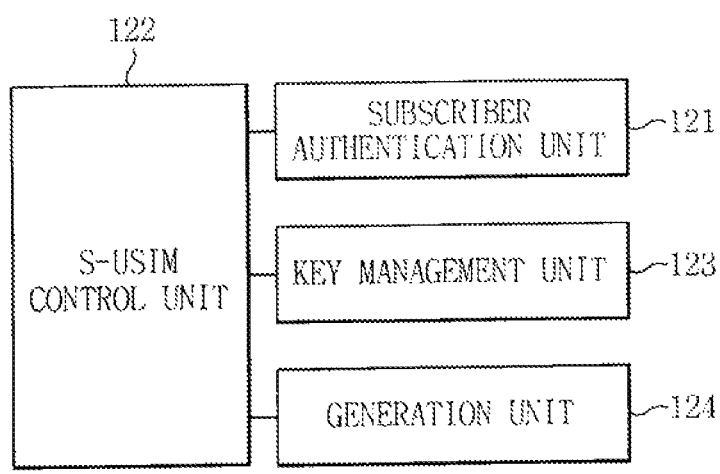
FIG. 3 is a block diagram showing the construction of the S-USIM unit of the terminal using the WCDMA 3G voice communication protection method according to an embodiment of the present invention.

FIG. 2 is a block diagram showing the construction of the terminal unit of the terminal using the WCDMA 3G voice communication protection method according to an embodiment of the present invention, and FIG. 3 is a block diagram showing the construction of the S-USIM unit of the terminal using the WCDMA 3G voice communication protection method according to an embodiment of the present invention.

First, the secure 3G terminal using the WCDMA 3G voice communication protection method according to an embodiment of the present invention will be described based on the calling terminal 100.

Referring to FIG. 2, the terminal unit 110 includes a Radio Frequency (RF) communication unit 111, an input unit 112, an audio processing unit 113, a control unit 114, a display unit 115, an encryption/decryption processing unit 116, and an interworking unit 117.

The RF communication unit 111 performs RF communication with the called terminal 200.

The input unit 112 inputs a voice from a relevant user.

The audio processing unit 113 converts the voice corresponding to the user into voice-coded data or converts voice-coded data corresponding to the secure 3G terminal 200, which is the called terminal, into a voice.

The control unit 114 sets its own S-USIM information, that is, S-USIM information received from its own S-USIM unit 120, to synchronous data. Here, the synchronous data includes terminal information such as a time value for a nonce, an S-USIM Identification (ID) required to search for a user key, a phone number, etc.

The control unit 114 performs a secure synchronization procedure based on the set synchronous data. In detail, the control unit 114 exchanges the synchronous data for the synchronous data of the called party-side secure mobile communication terminal 200, and establishes timing synchronization for secure communication based on the exchanged synchronous data.

Further, the control unit 114 transmits the voice-coded data converted by the audio processing unit 113 to the called terminal 200 via the RF communication unit 111. Furthermore, the control unit 114 transfers the voice-coded data received via the RF communication unit 111 to the audio processing unit 113.

The display unit 115 may display a voice communication protection procedure, which is currently being performed by the terminal unit 110, to the user. The display unit of the present invention is not limited to such a display unit 115.

The encryption/decryption processing unit 116 requests the encryption of voice-coded data to the S-USIM unit 120 or requests the decryption of encrypted voice-coded data to the S-USIM unit 120. Further, the encryption/decryption processing unit 116 transmits the encrypted voice-coded data to the called terminal 200 or transfers the decrypted voice-coded data to the audio processing unit 113, under the control of the control unit 114.

The interworking unit 117 allows the terminal unit 110 to operate in conjunction with the S-USIM unit 120 in the secure mobile communication terminal 100.

Referring to FIG. 3, the S-USIM unit 120 includes a subscriber authentication unit 121, an S-USIM control unit 122, a key management unit 123, and a generation unit 124.

The subscriber authentication unit 121 performs a procedure for authenticating the user of the secure mobile communication terminal, that is, the subscriber.

The S-USIM control unit 122 receives a request for S-USIM information from the relevant terminal unit and transmits S-USIM information corresponding to the request to the terminal unit.

Further, the S-USIM control unit 122 encrypts voice-coded data based on a session key that is generated by the generation unit 124 in response to an encryption request made by the relevant terminal unit, or decrypts encrypted voice-coded data based on a session key that is generated by the generation unit 124 in response to a description request.

The key management unit 123 searches for a user key corresponding to the received synchronous data.

The generation unit 124 generates a session key on the basis of the user key and the synchronous data.

Next, the WCDMA 3G voice communication protection method will be described in detail with reference to FIG. 4.

Figure 4:
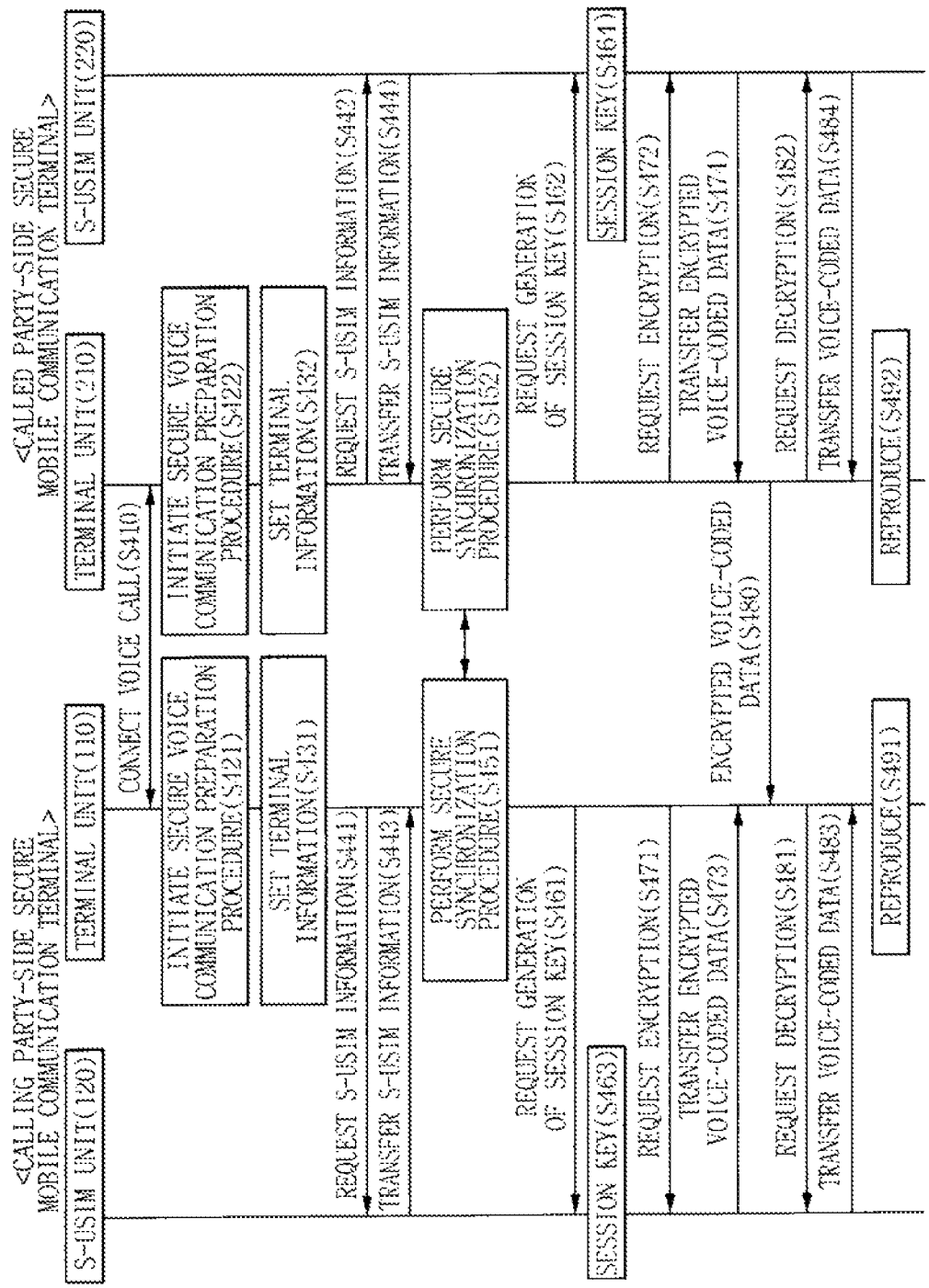
FIG. 4 is a flowchart showing a WCDMA 3G voice communication protection method according to an embodiment of the present invention.

FIG. 4 is a flowchart showing a WCDMA 3G voice communication protection method according to an embodiment of the present invention.

Referring to FIG. 4, the WCDMA 3G voice communication protection method according to an embodiment of the present invention is applied to each of a calling terminal 100 and a called terminal 200. In this case, the calling terminal 100 corresponds to a calling party-side secure mobile communication terminal, and includes a terminal unit 110 and an S-USIM unit 120. Further, the called terminal 200 corresponds to a called party-side secure mobile communication terminal, and includes a terminal unit 210 and an S-USIM unit 220.

Hereinafter, the calling terminal 100 and the called terminal 200 will be collectively referred to as "secure mobile communication terminals 100 and 200".

The calling terminal unit 110 requests a call to the called terminal unit 210, and the called terminal unit 210 accepts the request of the calling terminal unit 110. Then, a voice call is connected between the calling terminal 100 and the called terminal 200 at step S410.

For example, the calling terminal unit 110 converts a voice input from a relevant user into voice-coded data, transmits the voice-coded data to the called party-side secure 3G terminal, converts voice-coded data received from the called terminal unit 210 into a voice, and reproduces the voice.

After the voice call has been connected, each of the terminal units 110 and 210 of the secure mobile communication terminals initiates a secure voice communication preparation procedure of preparing for secure voice communication by collecting voice communication information, for example, its own S-USIM information and terminal information of the secure 3G terminal, at steps S421 and S422.

Each of the terminal units 110 and 210 of the secure mobile communication terminals sets terminal information, such as a time value of the secure 3G terminal, among the voice communication information, to synchronous data at steps S431 and S432.

Each of the terminal units 110 and 210 of the secure mobile communication terminals requests S-USIM information to a corresponding S-USIM unit 120 or 220 at steps S441 and S442. Each of the S-USIM units 120 and 220 transfers corresponding S-USIM information to a corresponding terminal unit 110 or 210 at steps S443 and S444. Each of the terminal units 110 and 210 of the secure mobile communication terminals sets the S-USIM information received from each S-USIM unit 120 or 220 to synchronous data.

The synchronous data set by the terminal unit 110 or 210 of each secure mobile communication terminal includes terminal information such as a time value for a nonce, an S-USIM ID required to search for a user key, a phone number, etc.

After each of the terminal units 110 and 210 of the secure mobile communication terminals has set the synchronous data, it performs a secure synchronization procedure based on the synchronous data at step S451 and S452.

In detail, the calling terminal unit 110 and the called terminal unit 210 exchange synchronous data collected after steps S431 and S432 (the secure voice communication preparation procedure) with each other, and establish timing synchronization for secure communication on the basis of the exchanged synchronous data.

The calling terminal unit 110 replaces the voice-coded data obtained by converting the voice input from its user with synchronous data and synchronous establishment data for establishing timing synchronization, and transfers the results of the replacement to the called terminal unit 210. The called terminal unit 210 replaces the voice-coded data obtained by converting the voice input from its user with the synchronous data and synchronous establishment data for establishing timing synchronization, and transfers the results of the replacement to the called terminal unit 110.

After steps S451 and S452 (the secure synchronization procedure) have been terminated, each of the terminal units 110 and 210 of the secure mobile communication terminals provides its own station (home station) synchronous data and foreign station synchronous data to a corresponding S-USIM unit 120 or 220, and requests the generation of a session key for voice communication from the corresponding S-USIM unit 120 or 220 at steps S461 and S462.

Each of the S-USIM units 120 and 220 of the secure mobile communication terminals searches for a user key corresponding to the received synchronous data, and generates a session key for secure voice communication based on the found user key and the synchronous data at steps S463 and S464.

Each of the terminal units 110 and 210 of the secure mobile communication terminals requests encryption to the corresponding S-USIM unit 120 or 220 by transferring the voice-coded data to the corresponding S-USIM unit at steps S471 and S472.

Each of the S-USIM units 120 and 220 of the secure mobile communication terminals encrypts the voice-coded data based on the session key in response to the encryption request at step S471 or S472, and transfers the encrypted voice-coded data to a corresponding terminal unit 110 or 210 at steps S473 and S474.

Each of the terminal units 110 and 210 of the secure mobile communication terminals transfers the encrypted voice-coded data to the secure mobile communication, terminal of the other party at step S480.

Each of the terminal units 110 and 210 of the secure mobile communication terminals requests decryption by transferring the encrypted voice-coded data, which has been received from the secure mobile communication terminal of the other party, to a relevant S-USIM unit 120 or 220 at steps S481 and S482.

Each of the S-USIM units 120 and 220 of the secure mobile communication terminals decrypts the encrypted voice-coded data on the basis of the session key in response to the decryption request made at step S481 or S482, and transfers the results of the decryption to the corresponding terminal unit 110 or 210 at steps S483 and S484.

Each of the terminal units 110 and 210 of the secure mobile communication terminals reproduces the received decryption results, that is, voice-coded data, at steps S491 and S492.

During the secure communication procedure ranging from steps S471 and S472 to steps S491 and S492, a procedure in which the terminal unit of the secure mobile communication terminal requests encryption by transferring voice-coded data to the S-USIM unit and in which the S-USIM unit encrypts the voice-coded data and transfers the encrypted voice-coded data to the terminal unit may be replaced with a procedure in which the terminal unit of the secure 3G terminal requests a random number to the S-USIM unit and in which the S-USIM unit generates the random number and provides it to the terminal unit and the terminal unit encrypts the voice-coded data using the received random number.

Further, during the secure communication procedure, a procedure in which the terminal unit of the secure 3G terminal requests decryption by transferring encrypted voice-coded data to the S-USIM unit and in which the S-USIM unit decrypts the encrypted voice-coded data and transfers voice-coded data to the terminal unit may be replaced with a procedure in which the terminal unit of the secure 3G terminal requests a random number to the S-USIM unit and in which the S-USIM unit generates the random number and provides it to the terminal unit and the terminal unit decrypts the encrypted voice-coded data using the received random number.

As described above, the preferred embodiments of the present invention have been disclosed in the drawings and the present specification. In this case, although specific terms have been used, they are merely intended to describe the present invention and are not intended to limit the meanings of the terms or the scope of the present invention disclosed in the accompanying claims. Accordingly, those skilled in the art will appreciate that various modifications and other equivalent embodiments are possible from the above descriptions. Therefore, the scope of the present invention should be defined by the technical spirit of the invention as disclosed in the accompanying claims.

According to embodiments of the present invention, there are advantages in that voice-coded data transmitted over a WCDMA 3G mobile communication network is encrypted and transmitted by a secure mobile communication terminal, so that a voice communication method of providing cryptographic end-to-end security against illegal access by a third party in the WCDMA 3G mobile communication network can be provided, and an S-USIM takes charge of an encryption function and a key management function and is used as a security token, thus improving the entire security and management efficiency.

What is claimed is:

1. A Wideband Code Division Multiple Access $3^{rd}$ Generation (WCDMA 3G) voice communication protection method, the method being performed by a terminal operating in conjunction with a Secure-Universal Subscriber Identity Module (S-USIM) for voice communication protection and configured to protect WCDMA 3G voice communication, comprising:
when a calling terminal connects a voice communication channel to a called terminal, preparing for secure voice communication by collecting information about relevant voice communication;
at the calling terminal, setting synchronous data by exchanging the voice communication information with the called terminal, and performing a secure synchronization procedure based on the set synchronous data;
at each of S-USIMs that operate in conjunction with the calling and called terminals, generating a session key for secure voice communication based on the synchronous data, the session key configured to be kept in each of the S-USIMs during the WCDMA 3G voice communication; and
performing secure communication by encrypting and transmitting voice-coded data to be transmitted based on the session key, and decrypting and reproducing received voice-coded data based on the session key,
wherein the secure synchronization procedure includes replacing the voice-coded data with the synchronous data and synchronous establishment data for establishing timing synchronization and exchanging a result of the replacement between the calling terminal and the called terminal.

2. The WCDMA 3G voice communication protection method of claim 1, wherein the preparing for the secure voice communication is configured to prepare for the secure voice communication by collecting voice communication information that includes USIM information corresponding to the S-USIM operating in conjunction with the terminal and terminal information.

3. The WCDMA 3G voice communication protection method of claim 1, wherein the performing the secure synchronization procedure is configured to establish timing synchronization for secure communication based on the synchronous data, thus performing the secure synchronization procedure.

4. The WCDMA 3G voice communication protection method of claim 1, wherein the generating the session key comprises:
searching for a user key corresponding to the synchronous data; and
generating the session key based on the user key and the synchronous data.

5. The WCDMA 3G voice communication protection method of claim 1, wherein the terminal operating in conjunction with the S-USIM corresponds to a secure 3G terminal.

6. A terminal using a Wideband Code Division Multiple Access $3^{rd}$ Generation (WCDMA 3G) voice communication protection method, comprising:
a Radio Frequency (RF) communication unit for allowing the terminal to transmit or receive synchronous data and voice data to or from another party terminal via RF communication;
an audio processing unit for converting a voice corresponding to a user of the terminal into voice-coded data or converting voice-coded data corresponding to the other party terminal into a voice;

an encryption/decryption processing unit for encrypting voice-coded data to be transmitted based on a session key generated by a relevant Secure-Universal Subscriber Identity Module (S-USIM), and decrypting received voice-coded data based on the session key, the session key configured to be kept in each of the S-USIMs during the WCDMA 3G voice communication; and a control unit for performing a secure synchronization procedure with the other party terminal using voice communication information, and performing secure communication by transmitting encrypted data and reproducing decrypted data, wherein the secure synchronization procedure includes replacing the voice-coded data with the synchronous data and synchronous establishment data for establishing timing synchronization and exchanging a result of the replacement between the calling terminal and the called terminal.

7. The terminal of claim 6, wherein the control unit allows the terminal to set synchronous data by exchanging the voice communication information with the other party terminal, and performs the secure synchronization procedure based on the set synchronous data.

8. The terminal of claim 6, wherein the session key corresponds to a session key for secure voice communication, which is generated by the S-USIM based on the synchronous data set using the secure synchronization procedure.

9. The terminal of claim 8, wherein the control unit performs the secure synchronization procedure by establishing timing synchronization for secure communication based on the synchronous data.

10. The terminal of claim 6, further comprising an interworking unit for allowing the terminal to operate in conjunction with the S-USIM corresponding to a security token.

11. The terminal of claim 6, further comprising a display unit for displaying a voice communication protection process that is currently being performed by the terminal to the user.

* * * * *